(12) United States Patent
Schneider

(10) Patent No.: US 7,056,557 B2
(45) Date of Patent: Jun. 6, 2006

(54) WOOD IMPREGNATION

(75) Inventor: Marc H. Schneider, Fredericton (CA)

(73) Assignee: Wood Polymer Technologies ASA, Oslo (NO)

( * ) Notice: Subject to any disclaimer, the term of this patent is extended or adjusted under 35 U.S.C. 154(b) by 0 days.

(21) Appl. No.: 10/700,623

(22) Filed: Nov. 5, 2003

(65) Prior Publication Data

US 2004/0091727 A1    May 13, 2004

Related U.S. Application Data

(62) Division of application No. 09/761,699, filed on Jan. 18, 2001, now Pat. No. 6,673,395.

(60) Provisional application No. 60/194,394, filed on Apr. 4, 2000.

(30) Foreign Application Priority Data

Jan. 18, 2000  (NO) ................................. 20000251

(51) Int. Cl.
*B05D 3/02* (2006.01)
*B05D 3/04* (2006.01)

(52) U.S. Cl. ...................... 427/303; 427/317; 427/379; 427/382; 427/393

(58) Field of Classification Search .............. 427/303, 427/317, 379, 381, 382, 389.8, 392, 393, 427/397, 297; 428/307.3, 308.8, 537.1
See application file for complete search history.

(56) References Cited

U.S. PATENT DOCUMENTS

| | | | |
|---|---|---|---|
| 3,560,255 A | 2/1971 | Maine | 117/148 |
| 3,787,344 A | 1/1974 | Kenaga et al. | 524/275 |
| 3,790,401 A | 2/1974 | Maine | 117/59 |
| 4,267,082 A | 5/1981 | Dhein et al. | 260/23 |
| 4,304,820 A | 12/1981 | Deubzer et al. | 428/452 |
| 4,618,647 A | 10/1986 | Fan et al. | 524/801 |

FOREIGN PATENT DOCUMENTS

| | | |
|---|---|---|
| DE | 1 902 252 | 9/1970 |
| GB | 1 570 311 | 6/1980 |
| JP | 49 028401 | 7/1974 |
| JP | 60 147303 | 8/1985 |

OTHER PUBLICATIONS

Derwent Accession No. 1987-226550, Nippon Oils & Fats Co., Ltd.: "Wood-plastic composite prodn. prepn.—by impregnating (meth)acrylate ester with copolymerisable monomer into wood and (co)polymerising the ester (mixt.)", JP,A,62152802, Jul. 7, 1987.

Derwent Accession No. 1976-10171X, Mitsubishi Petrochemical Co., Ltd., : "Resin-impregnated wood prepn—using vinyl monomer mixt. contg esters and dimethyl sulphoxide and irradiating," JP, A,50100207, Aug. 8, 1975.

Derwent Accession No. 1974-60765V, Showa Denko KK: "Homogeneously impregnating wood with plastics—using monomer mixt. and polymn catalyst and finally curing,", JP,A,49028401B, Jul. 26, 1974.

Derwent Accession No. 1974-14725V, Showa Denko KK: "Lumber impregnated with vinyl polymer—having increased impact resistant strength," JP,A,49004922B, Feb. 4, 1974.

Derwent Accession No. 1990-293993, Daiken Kogyo KK: "Prodn. of wooden composite material useful for building—by impregnating wood with drying oil fatty acid ester, polymerisable monomer and polymerization catalyst," JP,A,2206503, Aug. 16, 1990.

*Primary Examiner*—Kevin R. Kruer
(74) *Attorney, Agent, or Firm*—Finnegan, Henderson, Farabow, Garrett & Dunner, L.L.P.

(57) ABSTRACT

The present invention relates to a wood-polymer composite, particularly wood which has been impregnated with a mixture containing polymerizable organic compounds, and more particularly to a method for preparing a wood-polymer-composite by impregnating wood material and/or wood-based material with a mixture containing polymerizable organic compounds, and most particularly uses thereof.

8 Claims, No Drawings

WOOD IMPREGNATION

CROSS REFERENCE TO RELATED APPLICATIONS

This application is a division of application Ser. No. 09/761,699 filed Jan. 18, 2001 now U.S. Pat. No. 6,673,395, which claims the benefit of Provisional Application Serial No. 60/194,394, filed Apr. 4, 2000, the contents of both of which are incorporated herein by reference.

The present invention relates to a wood-polymer composite, particularly wood which has been impregnated with a mixture containing polymerizable organic compounds, and more particularly to a method for preparing a wood-polymer-composite by impregnating wood material and/or wood-based material with a mixture containing polymerizable organic compounds, and most particularly uses thereof.

BACKGROUND OF THE INVENTION

Wood-polymer composites of this category is based on polymerization of a monomer in the cavities of the cells (in-situ). The polymer produced is usually a thermoplastic (linear polymer). Monomers which belong to the vinyl monomer group are the ones usually used for this purpose. The vinyl monomers used are polymerized by means of radical chain polymerization. The vinyl monomers are non-polar, and will therefore not swell or react with the cell wall of the wood material. Some persons skilled in the art therefore claim that wood-polymer materials of this type are not <<real>> composites because there is no chemical bonding between the two combined materials. However, there is a high extent of infiltration and the material acquires altered physical and mechanical properties, and hence should be defined as a novel type of material. Properties which are substantially increased are density, hardness, wear resistance and elastic modulus. Liquid water and water vapor movements in the new material are greatly reduced, especially along the grain. In wood, transport along the grain is many times greater than across the grain, but in the new material they are about equal. Because the polymer does not react with the structure of the cell walls, the basic properties of the woody cell wall are not changed. Because the pores of the wood are blocked by polymer, the moisture can only move within the unchanged woody cell wall, in spaces between the cell wall and the polymer in the lumen, or in any cracks that might be in the material. The time for humidification or drying of cell lumen wood-polymer composites will therefore be 10 to 20 times longer than for untreated wood. This delay is an advantage in changing environments (especially a spill of liquid water). Because of the longer time, and because the polymer may induce a mechanical restraint of swelling, the dimensional stability of the new material is slightly improved. However, this can lead to local stresses in the material, which can result in microcracks when the material is subjected to extreme moisture gradients.

The monomers usually utilized for cell lumen wood-polymer composite are methyl methacrylate and styrene and unsaturated polyester oligomers, because of large supply of these chemicals and hence their low cost, as well as the relatively simple method of polymerizing them. Negative aspects of methyl methacrylate monomer are its substantial shrinkage (up to 25%) during polymerization and relatively high vapor pressure (it evaporates easily). Negative aspects of styrene monomer are its high vapor pressure (it evaporates easily) and easily-detectable odour (low odour threshold). A negative aspect of polyester oligomer is its higher viscosity which limits impregnation possibilities.

Monomer evaporation can lead to a low filling of surfaces by monomer. Monomer shrinkage can lead to substantail shrinkage and warping of materials during cure, and can cause voids between polymer and cell wall. By selecting different types of monomers these problems may be reduced.

One problem of previously known wood-polymer composites of this category is that after impregnation and curing, they continue to liberate vinyl monomers which have an easily-detected odour and which can be irritating and injurious to health.

Other problems of previously known wood-polymer composites are cracking, warping and colour alteration of the materials. These indicate that temperatures of the curing phase caused by exothermic heat of reaction have been too high, resulting in excess shrinkage and pyrolysis damage to the wood. The problem is increased dramatically with increased cross-sectional size, and in the past has limited the size of material which could be successfully treated.

Another problem of previously known wood-polymer composites results from a combination of moisture in the wood and the curing heat. Because of the exothermic heat of reaction, the temperature, especially of larger cross-sections, exceeds the boiling point of water. This causes rapid drying, followed by warping and cracking in moist wood. For this reason, previous art successful treatment has been generally limited to dry (6% moisture content and less) wood.

SUMMARY OF THE INVENTION

It is the object of the invention to provide a polymer impregnated wood of higher moisture content and having improved hardness, which also has low odour, and further, little cracking is observed in the finished material, thus eliminating the above disadvantages.

Essentially, this object is accomplished by using a wood material as a starting material having a moisture content from about 3% to about 90%, in particular from about 15% to about 35%, especially from about 20% to about 30%, and preferably about 25%, and subjecting said starting material to specific polymerizable monomer formulations and impregnation and curing conditions.

The specific mixture of polymerizable monomers and additives combined with a specific curing temperature schedule is important for producing odourless materials.

When wood-polymer composites are manufactured, moisture may be a problem, because the reaction exotherm causes temperatures above the boiling point of water in larger cross sections regardless of the heating method used. Rapid dehydration results. This causes deformations and cracks.

An essential feature of the present invention is to use starting wood materials having high moisture content. It is not prior knowledge to produce wood-polymer composites using moist wood as the starting material.

Wood, including cheap types and scrap material, can be used to produce noble wood materials such as imitation teak, mahogany, and others, and also provide them with novel properties like water resistance and simpler and reduced maintenance requirements. Since the monomers used are colourless, colours can be added, and thereby the finished product can be coloured throughout

DESCRIPTION OF THE PREFERRED EMBODIMENTS

According to the present invention, the foregoing and other objects are attained by a product, method and uses thereof as disclosed in the patent claims.

An embodiment of this invention comprises a wood-polymer composite, characterized by wood impregnated with polymerizable monomers selected from a group consisting of styrene, methylstyrene and tertiary butylstyrene, initiated with at least three initiators; crosslinked with divinyl benzene, ethylene glycol dimethacrylate, 1,3-butylene glycol dimethacrylate, ethylene glycol trimethacrylate or trimethylol propane trimethacrylate and containing oil or wax as a polymerization moderator and water repellent for the finished product.

A second embodiment of this invention comprises a method for preparing a wood-polymer composite by impregnating wood material and or wood-based material, characterized by the steps of:

utilizing said wood material having a moisture content of from about 15 to about 35% based on the weight of said wood material; impregnating said wood material with a composition selected from a group consisting of polymerizable monomers, a crosslinker and at least three initiators by means of vacuum and/or pressure; and curing said impregnated wood material in a hot air oven, steam or hot oil by means of a temperature sufficient to achieve the desired polymer loading.

A third embodiment of this invention comprises use the wood-polymer composite as a round, sawn or laminated wood product and more particularly a doorstep, doorlaminate, floor, handle, building board, pallet, acoustic wood, outdoor furniture, indoor furniture, container floor, play apparatus, benchtop, outdoor deck material, stair and railing material, fence stakes, or timber.

Particularly, said timber is a railway sleeper, especially an environmentally-friendly railway sleeper. Also, said timber can be a pole, especially an environmentally-friendly pole.

However, the use of said wood-polymer composite should not be restricted to those indicated above, but can include generally all kinds of use of wood products.

To obtain complete cure and low emissions from the finished product, it was found that a combination of initiators is needed. A lower temperature initiator starts the reaction, a second (higher temperature) carries it on and a third (highest temperature) finishes it. In most of these categories, alternative initiators may be used, depending on the reaction conditions, plant safety, cost and end-use requirements. Oil or wax is used to reduce the reaction exotherm during polymerization for the larger sizes of material, and also to act as water repellant for the material. The oil or wax has an additional benefit in that it is lower cost than monomer, reducing cost of the treatment.

The main monomers (styrene, methylstyrene (particularly para-methylstyrene) and tertiary butylstyrene) can be used alone or in any combination. The main advantage of methylstyrene and tertiary butylstyrene is their lower vapor pressure and thus lower emissions in the production plant and the finished product.

Quantities of the initiators and crosslinkers used depend on product, process and end-use but are between a minimum and maximum value for each. Below the minimum value it will not work; above the maximum value and the formulation will work but it is unnecessary and costly. Quantity of oil or wax is dependent on product size, curing conditions and desired end-use properties.

The polymerized monomers are distributed throughout the whole of the composite, or within a shell below the exterior surfaces and ends 2 mm deep and deeper and have a density of from about 0.8 a/cc to about 1.2 a/cc. The moisture content of the composite treated with the polymerizable monomers is from about 0 to about 50%.

The mixtures used are shown in Table 1.

TABLE 1

| Chemical | Second chemical (or alternate chemical) | Third chemical (or second alternate chemical) | Fourth chemical (or third alternate chemical) | Fifth chemical (or fourth alternate chemical) | Minimum % based on monomer | Maximum % based on monomer | Function |
| --- | --- | --- | --- | --- | --- | --- | --- |
| Styrene | Methylstyrene (vinyl toluene) | Tertiary butylstyrene | | | | | Main monomers |
| 2,2'-Azobis(2-methylbutane-nitrile) | Benzoyl peroxide | 2,2'-Azobis(2,4-dimethyl-pentaneniitrile) | 2,2'-Azobis(2-methylpropane nitrile) | | 0.1 | 0.3 | Lower temperature initiator |
| 1,1'-azobis(cyano-cyclohexane-carbonitrile) | | | | | 0.1 | 0.3 | Higher temperature initiator |
| Tertiary butyl perbenzoate | Di-tertiary butyl peroxide | | | | 0.5 | 1.5 | Highest temperature initiator |
| Di-tertiary butyl peroxide | | | | | 0.5 | 1.5 | Highest temperature initiator (for high-temperature curing) |

TABLE 1-continued

| Chemical | Second chemical (or alternate chemical) | Third chemical (or second alternate chemical) | Fourth chemical (or third alternate chemical) | Fifth chemical (or fourth alternate chemical) | | | Function |
|---|---|---|---|---|---|---|---|
| Divinyl benzene | Ethylene glycol dimethacrylate | Ethylene glycol trimethacrylate | 1,3-butylene glycol dimethacrylate | Trimethylol propane trimethacrylate | 2 | 5 | Crosslinker |
| Petroleum oil | Vegetable oil | Petroleum wax | Vegetable wax | | 0 | 50 | Additive |

The following Examples will further illustrate the invention.

EXAMPLES

Beech Timbers

Materials and Methods

Six beech railway sleepers were used for the experiment. Some of these were cut into smaller samples and some were treated whole.

Type of Wood: Beech (*Fagus sylvatica*)

The dimensions of samples from the six beech sleepers were as follows:
Small samples: 65×55×280 mm, 96 pieces;
Medium samples: 55×145×800 mm; 12 pieces;
Large samples 240×145×800 mm; 3 pieces;
<<Full scale>>: 240×145×1700 mm; 3 pieces.

Table 2 shows the dry-density and moisture profile of the sleepers as used in the experiment. As seen in Table 2, the sleepers had high moisture content. There was also great variation in moisture content among the sleepers and within each individual sleeper. Each of the six parts of Table 2 represent a cross section of an individual sleeper. It was expected that variations in moisture content also would be found in the longitudinal direction of each individual sleeper. Average dry-density of the sleepers was 663 $kg/m^3 \pm 39$ $kg/m^3$.

TABLE 2

Sample number (upper) dry-density in $kg/m^3$ (center) and moisture content (lowest number) of the individual control samples taken from the cross section of the six sleepers

| | 1 | 624 | 33.4% | | 2 | 662 | 30.2% |
|---|---|---|---|---|---|---|---|
| 1 | 3 | 5 | 7 | 1 | 3 | 5 | 7 |
| 611 | 626 | 629 | 586 | 647 | 653 | 650 | 630 |
| 27.7% | 36.9% | 36.1% | 31.7% | 28.6% | 32.3% | 30.7% | 27.9% |
| 2 | 4 | 6 | 8 | 2 | 4 | 6 | 8 |
| 630 | 621 | 661 | 628 | 652 | 731 | 672 | 660 |
| 30.0% | 36.2% | 37.9% | 30.7% | 25.8% | 33.7% | 35.5% | 27.2% |
| | 3 | 677 | 30.2% | | 4 | 671 | 27.3% |
| 1 | 3 | 5 | 7 | 1 | 3 | 5 | 7 |
| 714 | 697 | 687 | 659 | 695 | 708 | 683 | 646 |
| 30.5% | 37.9% | 37.1% | 25.3% | 25.5% | 34.6% | 29.6% | 22.3% |
| 2 | 4 | 6 | 8 | 2 | 4 | 6 | 8 |
| 664 | 666 | 659 | 673 | 708 | 662 | 660 | 604 |
| 23.7% | 31.2% | 29.3% | 26.4% | 24.0% | 30.4% | 27.4% | 24.5% |
| | 5 | 704 | 38.2% | | 6 | 640 | 28.1% |
| 1 | 3 | 5 | 7 | 1 | 3 | 5 | 7 |
| 699 | 679 | 664 | 645 | 660 | 659 | 602 | 609 |
| 38.5% | 39.6% | 33.1% | 35.0% | 26.3% | 27.4% | 27.2% | 27.5% |
| 2 | 4 | 6 | 8 | 2 | 4 | 6 | 8 |
| 806 | 717 | 721 | 702 | 658 | 643 | 638 | 651 |
| 41.0% | 41.7% | 43.1% | 33.8% | 29.0% | 30.7% | 28.8% | 27.6% |

Impregnation

For all the treatments, <<full-cell>> impregnation was used. The wood product was placed in an autoclave and a vacuum of from about 0.01 to about 0.03 bar was established for a specific time ($t_V$) prior to filling the vessel with an impregnating fluid. When the fluid was in, atmospheric pressure was re-established and then an overpressure of about 7,5 bar was produced. The overpressure was maintained for a specific time ($t_P$).

Curing

All curing of monomer was carried out in a hot air oven having set temperatures of 70 and 140° C. Because the oven had residual heat in the heating elements, the temperature rose to 80° C. after operation of several hours at a set temperature of 70° C. Nevertheless, the temperature of the curing is referred to as 70° C.

Completed Treatments and Evaluations Thereof

Twenty-five different treatments were carried out Each treatment was varied as regards the size of the wood materials, proportion of chemicals in the mixture, time of vacuum and pressure during the impregnating processes, as well as temperature and time of the curing processes. Four steps of the test were completed. A short description and evaluation of them is outlined hereinafter.

Step 1

Step 1 is comprised of sixteen different treatments of six small samples of each individual treatment. A sample from each sleeper was used such that variation of the wood materials of the different treatments were distributed as evenly as possible. These sixteen treatments were the basis for evaluation of impregnating quality, as well as evaluation of chemistry and curing completeness. Different times of vacuum and pressure were used. These are summarized in Table 3, The treatments can be divided into four main groups; a: treatment 1–4, b: treatment 5–8, c: treatment 9–12, d: treatment 13–16.

Group a

Group a was treated using the first chemical formula. Time of vacuum was short, 5–8 min. Time of pressure was varied from 5 to 18 min. Time of curing at 70° C. was varied from 3 to 6,5 h. Time of post-curing at 140° C. was about 4 h. The conversion level of these treatments was low, thus indicating high evaporation of monomer during the curing process. Exothermic heat of reaction was not observed, indicating that the polymerization was not complete. No odour after completed curing was recognized, indicating very low values of residual monomer. As the samples dried, they shrank. The drying was severe, so it produced cracks in the materials. Residual moisture was estimated to be 0%.

Group b

After evaluation of group a, the concentration of initiator in the monomer mixture was increased. This was an attempt to initiate curing earlier. Time of vacuum was prolonged to 11–15 min. Time of pressure was varied from 4 to 19 min. Time of curing at 70° C. was varied from 6 to 10 h. Time of post-curing at 140° C. was 6 h. The samples were cooled before post-curing. During the longer curing time at 70° C., exothermic heat of reaction was detected. For treatments numbers 6, 7 and 8 this was observed after 7 h wherein the core temperature of the materials exceeded the surface temperature of the samples. No odour after completed post-curing at 140° C. was recognized. Moisture reduction and crack formation were the same as observed for group a.

Group c

After evaluation of group b, curing at 70° C. without post-curing was done. The same chemical formula as for group b was used. Time of curing at 70° C. was prolonged to 17–20 h to observe when the exothermic reaction occurred and how high the core temperature became. The core temperature exceeded the surface temperature after 5–7 h with a maximum occuring after 8,5–11 h. Time of vacuum was slightly reduced to 8,5–11 min. Time of pressure was varied from 4,5 to 28 min. Measuring was done after curing at 70° C. The odour was <<medium>> after curing at 70° C. This indicated residual monomers which have not reacted. To obtain consistent evaluation of polymer uptake, the samples were later post-cured at 140° C., but this is not reported in Table 3.

Group d

After evaluation of group c, it was decided to use another initiator in an attempt to start polymerization at an earlier stage and possibly increase conversion. For this group, measurements and evaluation were made after curing at 70° C. Post-curing at 140° C. was carried out at a later stage to obtain consistent evaluation of polymer uptake and conversion. Time of vacuum was reduced to 5–12 min. Time of pressure was varied from 0,5 to 4,5 min. Time of curing at 70° C. was varied from 10 to 12 h. Dramatically shortening of the curing process was observed. The time until the core temperature exceeded the surface temperature was about 2 h, and the maximum temperature was observed according to 4,5 to 5 h. This effected the odour after treatment. The odour was classified as <<low>> which indicates a high level of conversion. Calculated conversion rose dramatically from 72% for groups a–c to 88% for group d. The new initiator was successful in reducing the reaction time and increasing conversion.

Step 2

Step 2 is comprised of three individual treatments of sleepers 1, 2 and 3, Details are given in Table 4, treatment numbers 17, 18 and 19.

Time of vacuum was varied from 11 to 14,5 min., and time of pressure was varied from 2,5 to 6,3 min. For the three treatments, temperature of the oven stabilized at 76 to 82° C. This was held for 18 h. The samples had a zone about 4 mm deep on the surface which had low polymer content, indicating monomer evaporation.

Half of all samples of step 2 were post-cured at 140° C. for 20 h. This produced greater shrinkage, deformation and internal cracks in the materials. In addition, the core was dark brown as a result of the high temperature during such a long time. The internal cracks were not visible at the surface. The cracks had the same appearance as those produced by drying wood using conditions that are too severe. Post-curing resulted in a residual moisture of 0%. It is not possible to notice any odour from the materials and residual monomers were therefore considered to be at a very low level. This demonstrates the chemical mixture clearly affects the result.

Step 3

Step 3 was comprised of three individual treatments of large samples (full cross section) of sleeper 1, 2 and 3. Details are given in Table 4, treatments numbers 20, 21 and 22. Time of vacuum was varied from 5 to 7,5 min. For the three treatments temperature of the oven stabilized at 84 to 88° C. This was held for 19–22 h.

Step 4

Step 4 was comprised of three individual treatments of <<full scale>> samples of sleepers 4,5 and 6. Details are given in Table 4, treatments numbers 23, 24 and 25. Time of vacuum was varied from 18 to 23 min. and time of pressure was varied from 8 to 9,5 min. For the three treatments, temperature of the oven stabilized at 86 to 88° C. This was held for 19–23 h.

TABLE 3

Summary of treatments 1–16

| | Treatment No: | | | | | | | |
|---|---|---|---|---|---|---|---|---|
| | 1 | 2 | 3 | 4 | 5 | 6 | 7 | 8 |
| Samples | small | small | small | small | small | small | small | small |
| Number | 6 | 6 | 6 | 6 | 6 | 6 | 6 | 6 |
| Impregnating | | | | | | | | |
| Wood | Beech | Beech | Beech | Beech | Beech | Beech | Beech | Beech |
| Moisture | measur. | measur. | measur. | measur. | measur. | measur. | measur. | measur. |
| Density | measur. | measur. | measur. | measur. | measur. | measur. | measur. | measur. |
| Vacuum | 0.05 | 0.05 | 0.05 | 0.05 | 0.05 | 0.05 | 0.05 | 0.05 |
| Pressure | 7 | 7 | 7 | 7 | 7 | 7 | 7 | 7 |
| Time vacuum <0.1 bar (min.) | 5.2 | 6.7 | 6.3 | 7.8 | 11.2 | 11.6 | 13.1 | 14.9 |
| Time pressure >7 bar (min.) | 4.8 | 8.2 | 17.5 | 18.7 | 3.7 | 7.5 | 16.8 | 19.4 |
| lot time process (min.) | 26 | 29.9 | 37.3 | 41.0 | 28.0 | 32.8 | 44.0 | 48.5 |
| Curing | | | | | | | | |
| Heat source | oven | oven | oven | oven | oven | oven | oven | oven |
| Temperature 1 | 74 | 76 | 76 | 76 | 76 | 78 | 80 | 80 |
| Temperature 2 | 136 | 140 | 140 | 140 | 136 | 140 | 140 | 140 |
| Time temp 1 (h) | 3 | 4.4 | 5.1 | 6.4 | 6 | 7.5 | 8.1 | 9.8 |
| Time temp 2 (h) | 4.2 | 4.2 | 4.2 | 4.2 | 6 | 6 | 6 | 6 |
| Chemicals | | | | | | | | |
| Vinyl-toluene | 58.0% | 58.0% | 58.0% | 58.0% | 58.0% | 58.0% | 58.0% | 58.0% |
| Styrene | 25.5% | 25.5% | 25.5% | 25.5% | 25.5% | 25.5% | 25.5% | 25.5% |
| Oil | 16.5% | 16.5% | 16.5% | 16.5% | 16.5% | 16.5% | 16.5% | 16.5% |
| | 100.0% | 100.0% | 100.0% | 100.0% | 100.0% | 100.0% | 100.0% | 100.0% |
| DVB (63%) | 3.10% | 3.10% | 3.10% | 3.10% | 3.10% | 3.10% | 3.10% | 3.10% |
| 1,1'-azobis (tyclohexane-carbonitrile) | 0.20% | 0.20% | 0.20% | 0.20% | 0.35% | 0.35% | 0.35% | 0.35% |
| DTBP (98%) | 0.30% | 0.30% | 0.30% | 0.30% | 0.30% | 0.30% | 0.30% | 0.30% |
| 2,2'-azobis (2,4 dimethyl-pentanenitrile) | | | | | | | | |
| Measurements | | | | | | | | |
| Moisture | 25% | 25% | 25% | 25% | 24% | 24% | 24% | 24% |
| weight (1) g | 725 | 775 | 756 | 819 | 742 | 794 | 735 | 762 |
| weight (2) g | 1015 | 1083 | 1107 | 1157 | 1095 | 1129 | 1060 | 1096 |
| weight (3) g | | | | | 986 | 1013 | 934 | 967 |
| weight (4) g | 787 | 858 | 862 | 882 | 852 | 869 | 828 | 846 |
| Calculations | | | | | | | | |
| Monomer loading | 50.0% | 49.7% | 58.0% | 51.6% | 59.0% | 52.3% | 54.8% | 54.4% |
| Polymer loading | 35.7% | 38.4% | 42.5% | 34.6% | 42.4% | 35.7% | 39.7% | 37.7% |
| Level of conversion | 71.4% | 77.3% | 73.3% | 67.1% | 71.8% | 68.3% | 72.4% | 69.3% |
| Hardness 1 | 4.5 | 4.8 | 5.0 | 4.6 | 4.4 | 5.4 | 5.2 | 4.5 |
| Hardness 2 (4 mm into sample) | 4.2 | 6.3 | 7.4 | 7.0 | 5.7 | 7.0 | 6.8 | 7.1 |
| Hardness control pr | 3.3 | 3.4 | 3.1 | 3.3 | 3.1 | 3.5 | 3.1 | 3.1 |
| Hardness improvement: % HB 1 | 36% | 41% | 61% | 39% | 42% | 54% | 68% | 45% |
| Hardness improvement: % HB 2 | 27% | 85% | 139% | 112% | 84% | 100% | 119% | 129% |
| Evaluation | | | | | | | | |
| Odour | no odour | no odour | no odour | no odour | no odour | no odour | no odour | no odour |
| Colour | golden | golden | golden | golden | golden | golden | golden | golden |

| | Treatment No: | | | | | | | |
|---|---|---|---|---|---|---|---|---|
| | 9 | 10 | 11 | 12 | 13 | 14 | 15 | 16 |
| Samples | small | small | small | small | small | small | small | small |
| Number | 6 | 6 | 6 | 6 | 6 | 6 | 6 | 6 |
| Impregnating | | | | | | | | |
| Wood | Beech | Beech | Beech | Beech | Beech | Beech | Beech | Beech |
| Moisture | measur. | measur. | measur. | measur. | measur. | measur. | measur. | measur. |
| Density | measur. | measur. | measur. | measur. | measur. | measur. | measur. | measur. |
| Vacuum | 0.05 | 0.05 | 0.05 | 0.05 | 0.05 | 0.05 | 0.05 | 0.05 |
| Pressure | 7 | 7 | 7 | 7 | 7 | 7 | 7 | 7 |
| Time vacuum <0.1 bar (min.) | 8.6 | 8.6 | 10.1 | 10.8 | 6.3 | 4.9 | 5.2 | 11.9 |
| Time pressure >7 bar (min.) | 4.5 | 9.0 | 13.8 | 28.0 | 0.4 | 4.1 | 0.4 | 4.5 |
| lot time process (min.) | 28.0 | 31.7 | 37.7 | 54.1 | 19.4 | 24.3 | 23.9 | 31.3 |

TABLE 3-continued

| Curing | | | | | | | | |
|---|---|---|---|---|---|---|---|---|
| Heat source | oven | oven | oven | oven | oven | oven | oven | oven |
| Temperature 1 | 80 | 82 | 82 | 82 | 80 | 80 | 80 | 80 |
| Temperature 2 | 0 | 0 | 0 | 0 | 0 | 0 | 0 | 0 |
| Time temp 1 (h) | 17 | 17.6 | 19 | 19.8 | 10 | 10.5 | 11.6 | 12.2 |
| Time temp 2 (h) | 0 | 0 | 0 | 0 | 0 | 0 | 0 | 0 |
| Chemicals | | | | | | | | |
| Vinyl-toluene | 58.0% | 58.0% | 58.0% | 58.0% | 58.0% | 58.0% | 58.0% | 58.0% |
| Styrene | 25.5% | 25.5% | 25.5% | 25.5% | 25.5% | 25.5% | 25.5% | 25.5% |
| Oil | 16.5% | 16.5% | 16.5% | 16.5% | 16.5% | 16.5% | 16.5% | 16.5% |
| | 100.0% | 100.0% | 100.0% | 100.0% | 100.0% | 100.0% | 100.0% | 100.0% |
| DVB (63%) | 3.10% | 3.10% | 3.10% | 3.10% | 3.10% | 3.10% | 3.10% | 3.10% |
| 1,1'-azobis (tyclohexane-carbonitrile) | 0.35% | 0.35% | 0.35% | 0.35% | 0.20% | 0.20% | 0.20% | 0.20% |
| DTBP (98%) | 0.30% | 0.30% | 0.30% | 0.30% | 0.30% | 0.30% | 0.30% | 0.30% |
| 2,2'-azobis (2,4 dimethyl-pentanenitrile) | | | | | 0.125% | 0.125% | 0.125% | 0.125% |
| Measurements | | | | | | | | |
| Moisture | 20% | 20% | 20% | 20% | 16% | 16% | 16% | 16% |
| weight (1) g | 724 | 746 | 732 | 780 | 701 | 712 | 685 | 713 |
| weight (2) g | 1040 | 1061 | 1074 | 1115 | 1071 | 1073 | 1022 | 1066 |
| weight (3) g | 926 | 937 | 938 | 968 | 956 | 1002 | 947 | 999 |
| weight (4) g | 850 | 870 | 862 | 876 | 928 | 938 | 888 | 924 |
| UZ,9/15 Calculations | | | | | | | | |
| Monomer loading | 52.4% | 50.7% | 56.1% | 51.5% | 61.2% | 58.8% | 57.1% | 57.4% |
| Polymer loading | 40.9% | 39.9% | 41.3% | 34.8% | 53.6% | 52.8% | 50.4% | 50.3% |
| Level of conversion | 78.1% | 78.8% | 73.7% | 67.5% | 87.5% | 89.8% | 88.3% | 87.6% |
| Hardness 1 | 4.5 | 4.4 | 4.6 | 4.5 | 5.3 | 5.7 | 5.1 | 5.2 |
| Hardness 2 (4 mm into sample) | 8.7 | 7.3 | 5.6 | 7.5 | 10.0 | 8.9 | 9.7 | 9.6 |
| Hardness control pr | 3.3 | 3.4 | 3.1 | 3.3 | 3.1 | 3.5 | 3.1 | 3.1 |
| Hardness improvement: % HB 1 | 36% | 29% | 48% | 36% | 71% | 63% | 65% | 68% |
| Hardness improvement: % HB 2 | 164% | 115% | 81% | 127% | 223% | 154% | 213% | 210% |
| Evaluation | | | | | | | | |
| Odour | medium | medium | medium | medium | low | low | low | low |
| Colour | dry | dry | dry | dry | malt/dry | malt/dry | malt/dry | malt/dry |

TABLE 4

| | Step 2 | | | Step 3 | | | Step 4 | | |
|---|---|---|---|---|---|---|---|---|---|
| | \multicolumn{9}{c}{Summary of treatments 17–25} | | | | | | | | |
| Treatment No: | 17 | 18 | 19 | 20 | 21 | 22 | 23 | 24 | 25 |
| Samples | medium | medium | medium | full c.s. | full c.s. | full c.s. | full c.s. | full c.s. | full c.s. |
| Number | 4 | 4 | 4 | | | | | | |
| Impregnating | | | | | | | | | |
| Type of wood | Beech | Beech | Beech | Beech | Beech | Beech | Beech | Beech | Beech |
| Vacuum | 0.05 | 0.05 | 0.05 | 0.05 | 0.05 | 0.05 | 0.05 | 0.05 | 0.05 |
| Pressure | 7 | 7 | 7 | 7 | 7 | 7 | 7 | 7 | 7 |
| Time vacuum <0.1 bar (min.) | 14.4 | 10.9 | 11.2 | 16.1 | 17.5 | 11.2 | 20.3 | 18.2 | 22.8 |
| Time pressure >7 bar (min.) | 6.3 | 2.5 | 6.0 | 7.7 | 5.6 | 4.9 | 9.5 | 7.7 | 8.8 |
| lot time process (min.) | 36.4 | 25.2 | 28.4 | 34.0 | 34.7 | 26.6 | 39.6 | 35.7 | 42.0 |
| Curing | | | | | | | | | |
| Heating source | oven | oven | oven | oven | oven | oven | oven | oven | oven |
| Temperature 1 | 77 | 76 | 82 | 88 | 88 | 84 | 86 | 86 | 88 |
| Temperature 2 | 0 | 0 | 0 | 0 | 0 | 0 | 0 | 0 | 0 |
| Time temp 1 (timer) | 18 | 18 | 18 | 22 | 20 | 19 | 23 | 21 | 19 |
| Time temp 2 (timer) | 0 | 0 | 0 | 0 | 0 | 0 | 0 | 0 | 0 |
| Chemicals | | | | | | | | | |
| Vinyl-toluene | 58.0% | 58.0% | 58.0% | 58.0% | 58.0% | 58.0% | 58.0% | 58.0% | 58.0% |
| Styrene | 25.5% | 25.5% | 25.5% | 25.5% | 25.5% | 25.5% | 25.5% | 25.5% | 25.5% |
| Oil | 16.5% | 16.5% | 16.5% | 16.5% | 16.5% | 16.5% | 16.5% | 16.5% | 16.5% |
| | 100.0% | 100.0% | 100.0% | 100.0% | 100.0% | 100.0% | 100.0% | 100.0% | 100.0% |

TABLE 4-continued

Summary of treatments 17–25

|  | Step 2 | | | Step 3 Treatment No: | | | Step 4 | | |
|---|---|---|---|---|---|---|---|---|---|
|  | 17 | 18 | 19 | 20 | 21 | 22 | 23 | 24 | 25 |
|  | | | | | Samples | | | | |
|  | medium | medium | medium | full c.s. | full c.s. | full c.s. | full c.s. | full c.s. | full c.s. |
|  | | | | | Number | | | | |
|  | 4 | 4 | 4 | | | | | | |
| DVB (63%) | 3.10% | 3.10% | 3.10% | 3.10% | 3.10% | 3.10% | 3.10% | 3.10% | 3.10% |
| 1,1'-azobis (cyclohexane-carbonitrile) | 0.20% | 0.20% | 0.20% | 0.20% | 0.20% | 0.20% | 0.20% | 0.20% | 0.20% |
| DTBP (98%) | 0.30% | 0.30% | 0.30% | 0.30% | 0.30% | 0.30% | 0.30% | 0.30% | 0.30% |
| 2,2'-azobis (2,4 dimethyl-pentanenitrile) | 0.125% | 0.125% | 0.125% | 0.125% | 0.125% | 0.125% | 0.125% | 0.125% | 0.125% |
| Measurements | | | | | | | | | |
| Moisture | 11.5% | 15% | 13% | 28% | 25% | 25% | 22% | 33% | 23% |
| weight (1) kg | 3.81 | 4.4 | 4.33 | 20.2 | 21 | 21.2 | 43 | 46 | 39 |
| weight (2) kg | 5.88 | 6.3 | 6.07 | 30.5 | 30.5 | 28.5 | 57.5 | 58 | 58.5 |
| weight (3) kg | 5.47 | 5.78 | 5.72 | 28.6 | 28.4 | 26.3 | 54.5 | 55.5 | 56 |
| Calculations | | | | | | | | | |
| Monomer loading | 61.0% | 50.0% | 45.0% | 65.0% | 57.0% | 43.0% | 41.0% | 35.0% | 62.0% |
| Polymer loading | 52.0% | 40.0% | 40.0% | 57.0% | 48.0% | 34.0% | 36.0% | 31.0% | 57.0% |
| Level of conversion | 86.0% | 79.0% | 87.0% | 87.0% | 85.0% | 79.0% | 88.0% | 91.0% | 93.0% |
| Evaluation | | | | | | | | | |
| Odour | low | low | low | low | low | low | low | low | low |
| Colour | dry | dry | dry | dry | dry | dry | dry | dry | dry |

Monomer and Polymer Loading and % Conversion of Monomer to Polymer

Monomer and polymer loading, and conversion for the different treatments are given in Table 5, Table 6 and Table 7.

TABLE 5

Monomer and polymer loading and conversion of monomer to polymer for the small samples

| Treatment No | Before imp. weight (g) | After imp. weight (g) | After curing weight (g) | Mc imp | ML | PL | Conversion |
|---|---|---|---|---|---|---|---|
| 1 | 725 | 1015 | 787 | 18% | 47% | 28% | 59% |
|  | 56 | 43 | 32 | 6% | 11% | 4% |  |
| 2 | 775 | 1083 | 858 | 21% | 49% | 34% | 70% |
|  | 42 | 50 | 42 | 8% | 12% | 10% |  |
| 3 | 756 | 1107 | 863 | 25% | 58% | 42% | 73% |
|  | 41 | 34 | 49 | 9% | 8% | 10% |  |
| 4 | 819 | 1157 | 882 | 31% | 55% | 42% | 76% |
|  | 70 | 14 | 50 | 5% | 13% | 14% |  |
| 5 | 742 | 1095 | 852 | 23% | 59% | 41% | 71% |
|  | 40 | 33 | 59 | 6% | 8% | 13% |  |
| 6 | 794 | 1129 | 869 | 29% | 55% | 41% | 75% |
|  | 83 | 15 | 37 | 11% | 13% | 10% |  |
| 7 | 735 | 1060 | 828 | 24% | 55% | 40% | 73% |
|  | 71 | 65 | 40 | 8% | 17% | 11% |  |
| 8 | 762 | 1096 | 846 | 24% | 55% | 38% | 69% |
|  | 95 | 41 | 32 | 9% | 15% | 9% |  |
| 9 | 724 | 1040 | 850 | 18% | 51% | 38% | 75% |
|  | 31 | 37 | 37 | 3% | 8% | 7% |  |
| 10 | 746 | 1061 | 870 | 16% | 50% | 36% | 72% |
|  | 61 | 55 | 43 | 2% | 15% | 11% |  |

TABLE 5-continued

Monomer and polymer loading and conversion of monomer to polymer for the small samples

| Treatment No | Before imp. weight (g) | After imp. weight (g) | After curing weight (g) | Mc imp | ML | PL | Conversion |
|---|---|---|---|---|---|---|---|
| 11 | 732 | 1074 | 862 | 21% | 57% | 42% | 75% |
|  | 34 | 54 | 40 | 2% | 13% | 9% |  |
| 12 | 780 | 1115 | 876 | 25% | 54% | 41% | 75% |
|  | 39 | 20 | 38 | 5% | 9% | 10% |  |
| 13 | 701 | 1071 | 928 | 16% | 62% | 54% | 88% |
|  | 36 | 30 | 42 | 5% | 9% | 10% |  |
| 14 | 713 | 1073 | 938 | 16% | 59% | 52% | 89% |
|  | 53 | 47 | 22 | 8% | 9% | 8% |  |
| 15 | 685 | 1022 | 888 | 16% | 57% | 51% | 88% |
|  | 45 | 90 | 74 | 4% | 20% | 16% |  |
| 16 | 713 | 1066 | 924 | 16% | 58% | 51% | 88% |
|  | 74 | 44 | 37 | 6% | 14% | 11% |  |

Figures in italics are the standard deviation of the measurement of six samples of each treatment.
MC: "moisture content". Calculated average moisture content (dry basis) of the samples before impregnation.
ML: "monomer loading". Calculated monomer uptake in % of dry-weight of the wood material.
PL: "polymer loading". Calculated polymer uptake in % of dry-weight of the wood material after curing at 140° C.. It is expected that residual moisture is approximately 0% after such a curing.
Conversion: % conversion of monomer to polymer.

TABLE 6

Monomer and polymer loading and conversion of monomer to polymer for the medium-sized samples

| Treatment no. | Samp. no. | Weight before kg | Weight after kg | Weight cured 70° C. | MC | ML | PL 70° C. (3% mc) | Conv. 70° C. |
|---|---|---|---|---|---|---|---|---|
| 17 | 1B1 | 3.61 | 5.81 | 5.42 | 11% | 68% | 59% | 87% |
|  | 1B2 | 3.91 | 6.04 | 5.60 | 12% | 61% | 52% | 85% |
|  | 1B3 | 4.02 | 6.06 | 5.62 | 12% | 57% | 48% | 84% |
|  | 1B4 | 3.68 | 5.59 | 5.24 | 11% | 57% | 50% | 87% |
|  | Average | 3.81 | 5.88 | 5.47 | 11% | 61% | 52% | 86% |
| 18 | 2B1 | 4.52 | 6.28 | 5.67 | 14% | 44% | 32% | 73% |
|  | 2B2 | 4.61 | 6.49 | 5.89 | 18% | 48% | 36% | 75% |
|  | 2B3 | 4.48 | 6.38 | 5.87 | 16% | 49% | 39% | 80% |
|  | 2B4 | 3.97 | 6.05 | 5.68 | 11% | 58% | 51% | 88% |
|  | Average | 4.40 | 6.30 | 5.78 | 15% | 50% | 40% | 79% |
| 19 | 3B1 | 4.31 | 5.57 | 5.22 | 13% | 33% | 27% | 82% |
|  | 3B2 | 4.53 | 6.44 | 6.03 | 14% | 48% | 41% | 86% |
|  | 3B3 | 4.45 | 6.39 | 6.00 | 13% | 49% | 43% | 87% |
|  | 3B4 | 4.02 | 5.89 | 5.61 | 10% | 51% | 47% | 91% |
|  | Average | 4.33 | 6.07 | 5.72 | 13% | 45% | 40% | 87% |

No. of sample shows sleeper, section and location in the sleeper. Ex. 2B3 is a sample of sleeper no. 2, section B og board no. 3.
MC: "moisture content". Calculated average moisture content (dry basis) of the sample before impregnation.
ML: "monomer loading". Calculated monomer uptake in % of dry-weight of the wood material.
PL 70° C.. "polymer loading". Calculated polymer uptake in % of dry-weight of the wood material. The samples were cured at 70° C.. The calculation assumes a 3% moisture reduction during cure.
Conversion: % conversion of monomer to polymer.

TABLE 7

Monomer and polymer loading and conversion of monomer to polymer for the large samples

| Treat No. | Length | Samp. No. | Weight before kg | Weight after kg | Weight cured kg | MC | ML | PL 70° C. (3% mc) | Conv. |
|---|---|---|---|---|---|---|---|---|---|
| 20 |  | 1c | 20.2 | 30.5 | 28.6 | 28% | 65% | 57% | 87% |
| 21 | 80 cm | 2c | 21.0 | 30.5 | 28.4 | 25% | 57% | 48% | 85% |
| 22 |  | 3c | 21.2 | 28.5 | 26.3 | 25% | 43% | 34% | 79% |
| 23 |  | 4c | 43.0 | 57.5 | 54.5 | 22% | 41% | 36% | 88% |
| 24 | 170 cm | 5c | 46.0 | 58.0 | 55.5 | 33% | 35% | 31% | 91% |
| 25 |  | 6c | 39.0 | 58.5 | 56.0 | 23% | 62% | 57% | 93% |

The three first samples had a length of about 80 cm and the three last samples had a length of about 170 cm.
Sample number states sleeper and section. Ex. 4c, is a sample of sleeper no. 4, section C.
MC: "moisture content". Calculated average moisture content (dry basis) of the samples before impregnation.
ML: "monomer loading". Calculated monomer uptake in % of dry-weight of the wood material.
PL 70° C.: "polymer loading". Calculated polymer uptake in % of dry-weight of the wood material. The samples were cured at 70° C.. The calculation assumes a 3% moisture reduction during cure.
Conversion: % conversion of monomer to polymer.

Hardness of wood and the wood-polymer composite made from it is given in Table 8.

TABLE 8

Changes in Brinell-scale (HB) hardness as a result of the treatments

| Treatment No | HB Control | HB The surface | HB 4 mm | % increase HB-surface | % increase HB-4 mm |
|---|---|---|---|---|---|
| 1 | 3.3 | 4.5 | 4.2 | 36% | 26% |
| 2 | 3.4 | 4.8 | 6.3 | 41% | 85% |
| 3 | 3.1 | 5.0 | 7.4 | 64% | 141% |
| 4 | 3.3 | 4.6 | 7.0 | 40% | 115% |
| 5 | 3.1 | 4.4 | 5.7 | 41% | 80% |
| 6 | 3.5 | 5.4 | 7.0 | 52% | 97% |
| 7 | 3.1 | 5.2 | 6.8 | 68% | 119% |
| 8 | 3.1 | 4.5 | 7.1 | 47% | 133% |
| 9 | 3.3 | 4.5 | 8.7 | 37% | 162% |
| 10 | 3.4 | 4.4 | 7.3 | 29% | 115% |
| 11 | 3.1 | 4.6 | 5.6 | 49% | 81% |
| 12 | 3.3 | 4.5 | 7.5 | 38% | 129% |
| 13 | 3.1 | 5.3 | 10.0 | 67% | 216% |
| 14 | 3.5 | 5.7 | 8.9 | 62% | 150% |
| 15 | 3.1 | 5.1 | 9.7 | 65% | 211% |
| 16 | 3.1 | 5.2 | 9.6 | 70% | 215% |

Pine Timbers

Wood Species: Scots Pine (*Pinus sylvestris*)

Materials and Methods

Ten sleepers were received and their moisture content (MC) and heartwood/-sapwood location mapped for each sleeper. Each sleeper was weighed impregnation, after impregnation and after curing. MC was measured by cutting cores, separating them into increments, weighing each increment, ovendrying the increments and weighing them again. This method gave MC at various positions within each sleeper.

A 60 parts to 40 parts mixture of para-methyl styrene to styrene was the base monomer used. Based on the weight of this base monomer, the following ingredients were added: 20% mineral oil (reaction moderator and water repellant), 3,5% divinyl benzene (crosslinker), 0,5% 2,2'-azobis (2-methyl-butanenitrile) (low-temperature initiator), 0,2% 1,1'-azobis (cyclohexane-carbonitrile)(medium-temperature initiator) and 0,5% teriary butyl perbenzoate (high-temperature initiator).

Impregnation was carried out on all sleepers using vacuum for ½ hour, admitting monomer and then pressure of 5.3 bar. Pressure time for sleepers 1, 4 and 9 was ½ hour, for 2, 5, 6, 7 and 10 it was 1 hour and for sleeper 8 pressure time was 3 hours.

Curing was carried out in a chamber 300 mm larger in all dimensions than a single sleeper. Temperature of the curing chamber, the surface of the sleeper and at locations within the sleeper was measured as curing took place, Sleepers were treated and cured individually, except for the last two, which were processed together throughout.

Since rather severe internal checking ocurred in the sapwood portions of some of the first few sleepers treated, the curing temperature was controlled in some subsequent sleepers to try to decrease this checking.

After curing, cross-sections were cut from each sleeper in locations where temperature had been measured, and polymer content assessed for the section. MC of the heartwood was also measured at that time using cores. One sleeper was sawed longitudinally and densities were measured sequentially in sapwood, outer heartwood and inner heartwood for 1 m along the length.

Samples 50 m square in cross section and 150 mm long were prepared from untreated sapwood and heartwood, from treated heartwood, and from treated sapwood with and without internal checking. They were loaded perpendicular to the grain, parallel to the annual rings (tangentially), which is the same direction a rail plate would load them. The testing machine recorded load and displacement (measured by LVDT) in a datalogger. The area was 50 mm by 50 mm, in the center of the sample.

Completed Treatments and Evaluations Thereof

MC Just Before Treating

Moisture contents determined at the time of treating are given in Table 9.

TABLE 9

Representative MC just before treatment

| Sleeper # | Surface | Mld Sap | Deep Sap | Outer Heart | Inner Heart |
|---|---|---|---|---|---|
| 1 | 27.7% | 105.8% | 122.7% | 82.6% | 30.3% |
| 2 | 21.9% | 30.6% | 37.6% | 28.8% | 27.0% |
| 3 | 18.5% | 23.7% | 25.6% | 27.1% | 25.1% |
| 4 | 19.5% | 33.5% | 27.7% | 26.2% | 26.8% |
| 5 | 24.8% | 56.1% | 33.0% | 18.6% | 28.8% |
| 6 | 24.2% | 33.6% | 44.5% | 32.6% | 27.1% |
| 7 | 20.8% | 26.9% | 28.1% | 28.8% | 29.1% |
| 8 | 15.3% | 16.3% | 16.2% | 24.2% | 28.1% |
| 9 | 19.4% | 28.4% | 26.7% | 25.3% | 27.6% |
| 10 | 14.0% | 16.6% | 20.2% | 23.5% | 25.2% |
| Avg | 20.6% | 37.2% | 38.2% | 31.8% | 27.5% |

Sapwood penetration by monomer of all sleepers except number 1 was good because their MC was in the treatable range, Sapwood penetration of sleeper number 1 was limited to the drier shell, with the wetter sapwood not penetrated. Even so, overall uptake was similar to other sleepers.

Curing Quality

All sleepers cured and there was virtually no odour after cooling to room temperature. Pre-existing surface checking expanded very little and no new checks appeared.

Monomer in heartwood cured. This was determined by lack of smell and hardness values equivalent to wood-polymer composites, and not the lower values of untreated wood.

Internal checks in sapwood were minimized when curing temperature was moderated and when moisture content and sapwood depth were lower. The effect of curing temperature is shown in Table 10.

TABLE 10

Maximum temperatures reached in sleeper, and effect on checking

| Sleeper # (in sequence treated) | Surface | Shallow Sap | Deep Sap | Shallow Heart | Heart | Details | Checking |
|---|---|---|---|---|---|---|---|
| 4 | 113.1 | — | — | — | 133.6 | | |
| 9 | 107.2 | 119.5 | — | — | 98.5 | | |
| 1 | 99.5 | 97.8 | 77.6 | — | — | Sleeper mostly sapwood, limited penetration because of high MC | Little checking because of limited penetration |

TABLE 10-continued

Maximum temperatures reached in sleeper, and effect on checking

| Sleeper # (in sequence treated) | Surface | Shallow Sap | Deep Sap | Shallow Heart | Heart | Details | Checking |
|---|---|---|---|---|---|---|---|
| 2 | 101.5 | 109.8 | 115.7 | — | 119.2 | | Considerable checking |
| 7 | 111.4 | 115.3 | 125.1 | — | 98.6 | | Considerable checking |
| 5 | 125.0 | 110.9 | 113.8 | — | 103.0 | | Considerable checking |
| 8 | 99.6 | 99.6 | 98.1 | — | 87.5 | Maximum temperature limited | Little checking |
| 6 | 98.8 | 101.3 | 116.4 | — | 83.9 | Cured with 10 | Smaller and fewer checks |
| 10 | 98.8 | 101.3 | 116.4 | 90.9 | 83.9 | Maximum temperature limited, sleeper mostly heartwood | Smaller and fewer checks |

Sleeper appearance was good and they were clean and able to be easily handled without skin protection.

Monomer and Polymer Loading

Table 11 summarizes the loading results.

TABLE 11

Monomer and polymer loading of treated sleepers

| Sleeper # | Unloaded (kg) | Monomer Loading (kg) | Polymer Loaded (kg) | Weight Loss (kg) | Loss |
|---|---|---|---|---|---|
| 1 | 55.57 | 24.04 | 21.77 | 2.27 | 9.4% |
| 2 | 39.35 | 20.86 | 19.16 | 1.70 | 8.2% |
| 4 | 39.55 | 21.46 | 20.1 | 1.36 | 6.3% |
| 5 | 38.56 | 16.44 | 14.85 | 1.59 | 9.7% |
| 6 | 47.74 | 21.09 | 19.28 | 1.81 | 8.6% |
| 7 | 45.93 | 15.53 | 15.08 | 0.45 | 2.9% |
| 8 | 49.10 | 14.63 | 13.04 | 1.59 | 10.9% |
| 9 | 37.78 | 16.65 | 14.38 | 2.27 | 13.6% |
| 10 | 46.38 | 11 | 9.98 | 1.02 | 9.3% |
| Averages | | 17.97 | 16.40 | 1.56 | 8.8% |

Average monomer loading of the nine sleepers was about 22 kg. The weight loss during cure was about 2 kg per sleeper or about 9% of the monomer weight. Since high temperatures, some above boiling point of water, were reached during cure, some of the weight loss must be water. Thus the 2 kg weight loss from a sleeper is partly water and partly monomer. If it were all monomer loss, another way to express would be that the monomer to polymer conversion was 91%, which is slightly higher than for the best beech sleeper treatment.

Loading of Sapwood, Heartwood and Different Locations and MCs

Polymer loading for different parts of the sleepers were calculated from density measurements made from pieces cut from them. Nearly all available space was filled by polymer in sapwood, giving densities just greater than 1 g/cc (average 1.03 g/cc). Heartwood loading was greatest near sleeper ends and around cracks, and decreased with distance from the sleeper end, becoming zero about 30 cm from the end. Polymer in heartwood was mostly in latewood and maximum loadings were near 50% of available space (average density of 0.72 g/cc).

Any sapwood below about 30% MC treated well and all heartwood MC was suitable for treating when the sleepers were received.

Quality

There were surface checks present before treatment. These enlarged slightly during treatment. Sapwood shrunk somewhat more than heartwood, producing some rounded (2 to 3 mm) surfaces. No warping occured. Sleeper appearance was good.

Compression Strength and Stiffness

The values of untreated and treated sleepers are reported in Table 12.

TABLE 12

Stiffness and yield stress (MPa), density (g/cc) and polymer uptake of WPC and the untreated wood from which it was made

| Treatment | Yield stress | MOE | Density | Uptake |
|---|---|---|---|---|
| Untreated pine heartwood | 6 | 409 | 0.48 | — |
| Untreated pine sapwood | 5 | 991 | 0.54 | — |
| Pine heartwood WPC | 12 | 1058 | 0.74 | 51% |
| Pine sapwood WPC | 50 | 3087 | 1.04 | 100% |
| Checked pine sapwood WPC | 17 | 960 | 1.02 | 98% |

Since stiffness (MOE) and yield stress (load at which the material begins to crush) are mostly determined by earlywood properties when loading is in the tangential direction, and since heartwood WPC polymer is found mostly in latewood, it is expected that heartwood WPC properties would be similar to untreated wood as is indicated in the table. The high loading of sapwood WPC (reflected in high densities) increased strength and stiffness greatly. Sapwood yield stress and MOE values are about the same as values for treated hardwoods like birch.

These results indicate that resistance to compressive loading and to mechanical wear should be noticeably better in WPC sleepers than in the wood from which it was made.

The invention claimed is:

1. A wood-polymer composite, comprising wood material and/or a wood-based material containing a polymer of at least one polymerizable monomer selected from the group consisting of styrene, methylstyrene and tertiary butylstyrene that have been polymerized in the wood, said composite being prepared by the steps of:

providing wood material and/or wood-based material having a moisture content of from about 15 to about 35% based on the weight of said material; impregnating said material with a composition comprising at least one polymerizable monomer selected from the group consisting of styrene. Methylstyrene and tertiary butylstyrene, at least three polymerization initiators selected from low, medium, and high temperature initiators, wherein the at least one low temperature initiator is at least 0.1% based on the weight of the at least one polymerizable monomer of at least one initiator selected from the group consisting of 2,2'-azobis (2-methyl-butanenitrile), benzoyl peroxide, 2,2'-azobis (2,4-dimethyl-pentanenitrile), and 2,2'-azobis (2-methyl-propanentrile), wherein the at least one medium temperature initiator is at least 0.1% based on the weight of the at least one polymerizable monomer of 1,1'-azobis (cyclohexanecarbonitrile), and wherein the at least one high temperature initiator is at least 0.5% based on the weight of the at least one polymerizable monomer of at least one initiator selected from the group consisting of tertiary butyl perbenzoate and di-tertiary butyl peroxide, and divinyl benzene, ethylene glycol dimethacrylate, 1,3-butylene glycol dimethacrylate, ethylene glycol trimethacrylate or trimethylol propane trimethacrylate as a crosslinking agent; and curing said impregnated material with heat to a temperature sufficient to polymerize and crosslink the at least one polymerizable monomer in the material.

2. The wood-polymer composite according to claim 1, wherein said polymerizable monomers are styrene, para-methyl styrene, tertiary butylstyrene and combinations thereof.

3. The wood-polymer composite according to claim 1, wherein said polymer present in the composite is distributed throughout the whole of said composite.

4. The wood-polymer composite according to claim 1, wherein said polymer present in the composite is distributed within a shell that extends to a depth of 2 mm below exterior surfaces of the composite.

5. The wood-polymer composite according to claim 1, wherein said composite containing said polymer has a density of from about 0,8 g/cc to about 1,2 g/cc.

6. The wood-polymer composite according to claim 1, wherein said composite is a round, sawn or laminated wood product.

7. The wood-polymer composite according to claim 6, wherein the wood product is a railway sleeper.

8. The wood-polymer composite according to claim 6, wherein the wood product is a pole.

* * * * *